United States Patent
Bhogal et al.

(10) Patent No.: US 7,895,521 B2
(45) Date of Patent: Feb. 22, 2011

(54) BANDWIDTH USAGE AND LATENCY REDUCTION OF REMOTE DESKTOP SOFTWARE BASED ON PREFERRED RENDERING OF A USER SELECTED AREA

(75) Inventors: Kulvir S. Bhogal, Fort Worth, TX (US); Robert R. Peterson, Austin, TX (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 11/938,437

(22) Filed: Nov. 12, 2007

(65) Prior Publication Data
US 2009/0125838 A1 May 14, 2009

(51) Int. Cl.
*G06F 3/048* (2006.01)
(52) U.S. Cl. .................. 715/740; 715/733; 715/764; 715/781; 709/217; 709/220
(58) Field of Classification Search ............. 715/733, 715/744, 747, 751, 753, 764, 765, 781, 788, 715/700, 740; 709/200, 201, 203, 204, 217, 709/218, 219, 220
See application file for complete search history.

(56) References Cited

U.S. PATENT DOCUMENTS

| | | | |
|---|---|---|---|
| 7,487,454 B2 * | 2/2009 | Czerwinski et al. | 715/751 |
| 2007/0130165 A1 * | 6/2007 | Sjoblom et al. | 707/10 |
| 2009/0028398 A1 * | 1/2009 | Lundstrom | 382/128 |
| 2009/0096810 A1 * | 4/2009 | Green | 345/620 |

OTHER PUBLICATIONS

"The Old New Thing: Scrollbars Part 11: Towards an Even Deeper Understanding of the WM_NCCALCSIZE Message", MSDN Blogs, Sep. 15, 2003.

* cited by examiner

*Primary Examiner*—Xiomar Bautista
(74) *Attorney, Agent, or Firm*—Patents on Demand, P.A.; Brian K. Buchheit; Scott M. Garrett

(57) ABSTRACT

The present invention discloses a solution for bandwidth usage reduction of remote desktop software based on preferred rendering of a user selected area. The solution can allow a user to select a specified region of a remote desktop to gain precedence over non-selected regions. An area preference engine can be configured to convey user preference, settings, and selection areas. Selected regions can be user configured to render with different settings than non-selected regions such as resolution, color depth, frame rate, update frequency, and the like. Non-selected regions can be configured to receive lower priority updates than selected regions.

18 Claims, 3 Drawing Sheets

BANDWIDTH USAGE AND LATENCY REDUCTION OF REMOTE DESKTOP SOFTWARE BASED ON PREFERRED RENDERING OF A USER SELECTED AREA

BACKGROUND

1. Field of the Invention

The present invention relates to the field of remote desktop software and, more particularly, to bandwidth usage and latency reduction of remote desktop software based on preferred rendering of a user selected area.

2. Description of the Related Art

With the proliferation of powerful mobile computing devices, many activities such as remote administration via remote desktop software can now be performed on mobile computing devices. These activities were once the domain of workstations and desktop computers, but now are being replaced with mobile solutions, such as mobile phones, personal digital assistants (PDA), and mobile computing devices. While these mobile devices can computationally power remote desktop solutions, often times the network bandwidth available to these mobile devices is more limited than bandwidth available to desktop/workstation counterparts. For example, currently many mobile phones can only afford a few kilobytes of network bandwidth at any one time. As a result, mobile devices often perform poorly when involved in remote desktop activities. Similarly, desktop machines accessing network deployed content through a bandwidth constrained connection, such as a weak WIFI connection or a dial-up modem, often behave poorly in a remote desktop situation.

Currently remote desktop software operates by transferring data to render the entire screen area of the remote computer. Frequently, users are only interested in a portion of the desktop screen, such as an active application window. In such situations, network bandwidth is needlessly being utilized for rendering portions of the screen with very little interest to the user. Further, a direct correlation exists between available bandwidth and user experienced latency induced by relatively low data transfer rates across a network.

SUMMARY OF THE INVENTION

The present invention discloses a solution for bandwidth usage reduction of remote desktop software based on preferred rendering of a user selected area. The solution can allow a user to select a specified region of a remote desktop to gain precedence over non-selected regions. An area preference engine can be configured to convey user preference, settings, and selection areas. Selected regions can be user configured to render with different settings than non-selected regions such as resolution, color depth, frame rate, update frequency, and the like. Non-selected regions can be configured to receive lower priority updates than selected regions.

The present invention can be implemented in accordance with numerous aspects consistent with the materials presented herein. One aspect of the present invention can include a method for preferring an area of a remote desktop. The method can include a step of defining a region of a remote desktop executing on a client as a preferred rendering region. A message specifying the preferred rendering region can be conveyed from the client to a host server. The host server can convey data to the client that is used by the remote desktop to the client. The preferred rendering region can be preferred for rendering purposes over other areas of the remote desktop.

Another aspect of the present invention can include a remote desktop system that includes a host computing device, a remote computing device, and remote client software executing upon the remote computing device. The host computing device can be configured to execute a set of desktop applications. The remote computing device can permit a user to interact with the executing set of desktop applications from the remote computing device using remote desktop technologies. The remote client software can include a capability that permits a user to define a preferred rendering region of a remote desktop interface. A quantity of data conveyed from the host server to the remote computing device over a network connecting the two can be comparatively greater for the preferred rendering region than a quantity of data conveyed for other regions of the remote desktop.

Still another aspect of the present invention can include a remote desktop interface that includes a user selectable option for graphically defining a preferred region of a remote desktop interface. The preferred rendering region can be preferred for rendering purposes over other areas of the remote desktop that are displayed within the remote desktop interface. Additionally, a quantity of data conveyed from a host server to a client executing the remote desktop interface can be comparatively greater for the preferred rendering region than a quantity of data conveyed for other regions of the remote desktop.

It should be noted that various aspects of the invention can be implemented as a program for controlling computing equipment to implement the functions described herein, or as a program for enabling computing equipment to perform processes corresponding to the steps disclosed herein. This program may be provided by storing the program on a computer readable medium, such as a magnetic disk, an optical disk, a semiconductor memory or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
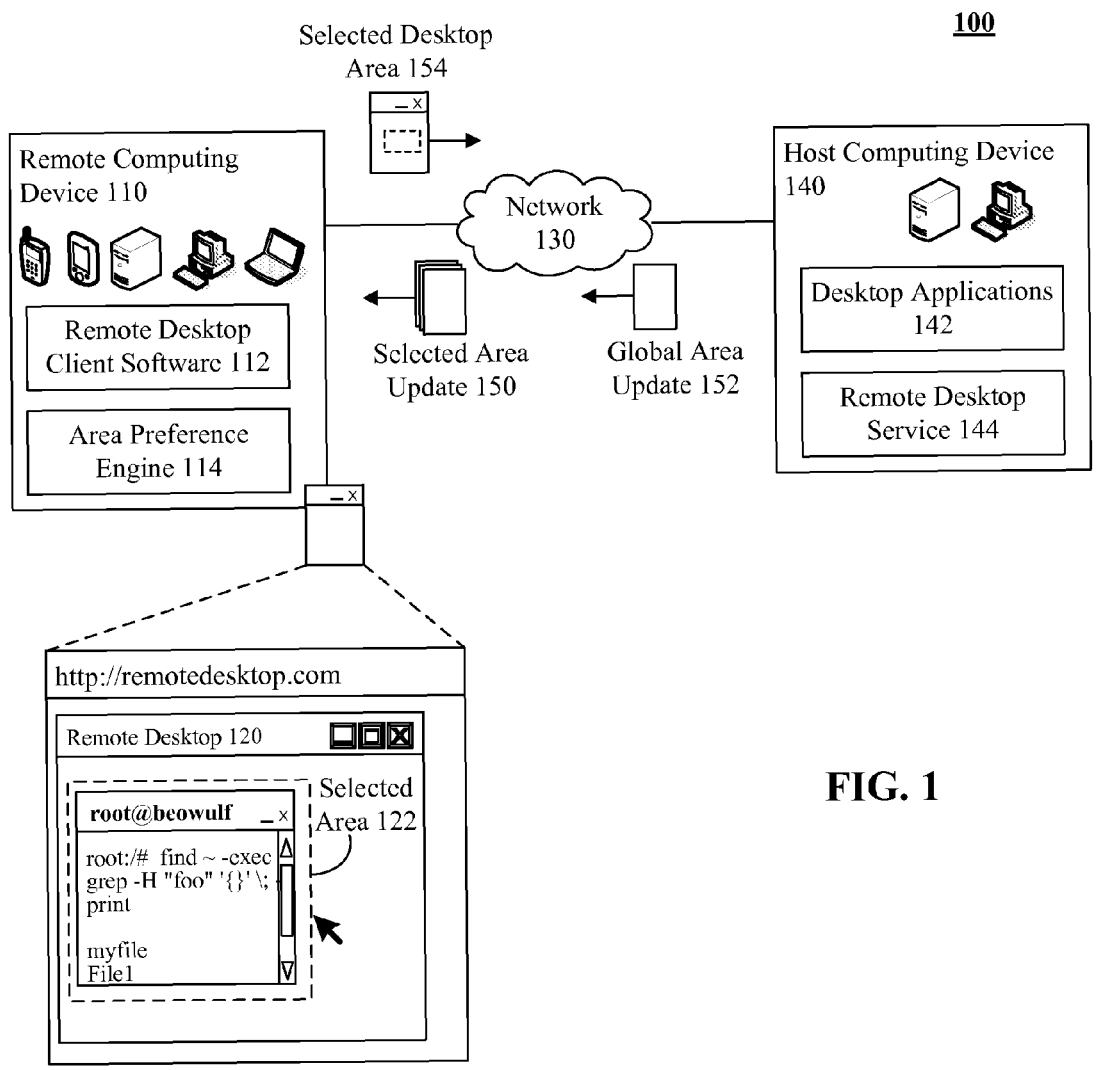
FIG. 1 is a schematic diagram illustrating a system for bandwidth usage and latency reduction of remote desktop software based on preferred rendering of a user selected area in accordance with an embodiment of inventive arrangements disclosed herein.

FIG. 1 is a schematic diagram illustrating a system 100 for bandwidth usage and latency reduction of remote desktop software based on preferred rendering of a user selected area in accordance with an embodiment of inventive arrangements disclosed herein. In system 100, a remote computing device 110 can communicate with a host computing device 140 via network 130. Remote desktop client software 112 can communicate with a universal resource identifier (URI) addressable remote desktop service 144 to interact with desktop applications 142. For example, a user can gain access desktop applications 142 such as command line interface applications, Web browsers, word processors, and the like.

In remote desktop 120, a user can define a user selected area 122 to receive preferred updates. Selected area 122 can be communicated to remote desktop service 144 via selected desktop area message 154. In response, service 144 can send selected area updates 150 and global area update 152 as configured by the user. Global area update 152 can be configured to occur less frequently and/or to otherwise consume relatively less bandwidth/resources than selected area update 150. When device 110 receives a selected area update, a refresh or rendering action can occur that is restricted to selected area 122. The global area update 152 can trigger a refresh action that applies to a remote desktop region 120 outside the selected area 122, or can apply to the entire remote desktop 120 region including the selected area 122.

To illustrate by example, four area updates 150 can occur for each global area update 152 in one instance of the application. In another example, the global area updates 152 may not occur at all, resulting in only the selected area 122 being updated in the remote desktop 120 until a user/device 110 specifies otherwise. In yet another instance, a resolution, color depth, frame rate, and other characteristics of the selected update area 150 can be greater than a corresponding characteristic of the global area update 152. Moreover, data conveyed over network 130 for the selected area 122 within update 150 can be comparatively greater than a quantity of data conveyed for other areas of the remote desktop 120 within global area update 152. Also, processing resources of device 110 and/or device 140 dedicated to rendering area 122 can be greater than resources used for rendering other regions of the remote desktop 120.

A number of optional enhancements can be applied to system 100. In one embodiment of system 100, a user can be permitted to select multiple areas 122 for preferred rendering within the remote desktop 120. In another embodiment, a magnification or zoom can be applied to the selected area 122 to make that area easier to read. The zoom can be a client-side zoom enabled by remote desktop client software 112. In still another embodiment, user defined parameters can be used to automatically establish a preferred area 122, such as through configurable settings of the area preference engine 114. For example, every time a user views an email message or conducts an instant messaging interaction within a portion of the remote desktop 120, that region can be automatically selected as a preferred area 122. In another example, any currently active window of the desktop 120 can be automatically established as a selected area 122 in accordance with user configurable settings.

Additionally, in one embodiment, the area preference engine 114 can be implemented to learn from past interactions, so that user specific behavior relating to automatically establishing selected areas 122 can by applied to remote desktop situations 120. Further, in another embodiment, settings and behavior relating to the selected area 122 rendering can vary depending upon characteristics of a device 110 upon which the remote desktop operates. For example, when the remote desktop 120 is a resource limited computing device having a small screen (e.g., a smart phone, a PDA, etc.) a display area for the selected area 122 can be automatically adjusted so that the selected area 122 dominates the small screen, using a variation on existing accessibility techniques for magnifying a select portion of a display screen.

As used herein, remote computing device 110 can include hardware/software device capable of executing remote desktop software, remote desktop services and the like. Remote computing device 110 can include, but not limited to, desktop computer, laptop, mobile phone, mobile computing device, personal digital assistant (PDA), and the like.

Remote desktop client software 112 can include, but is not limited to, RealVNC, rdesktop, FreeNX, PCANYWHERE, and the like. Remote desktop protocols able to convey information 150-154 can include, but not limited to, Virtual Network Computing (VNC), NX, Independent Computing Architecture (ICA), X11, and the like.

Area preference engine 114 can allow client software 112 to request selected and global update 150, 152 as configured by a user. Engine 114 can be responsible for communicating selected desktop area 154 to service 144. In one embodiment, engine 114 can be capable of managing characteristics of one or more selected areas 122. For example, a user can select two areas of a remote desktop window to render utilizing user configured settings.

As shown herein, network 130 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 130 can include local components and data pathways necessary for communications to be exchanged among computing device components and between integrated device components and peripheral devices. The network 130 can also include network equipment, such as routers, data lines, hubs, and intermediary servers which together form a packet-based network, such as the Internet or an intranet. The network 130 can further include circuit-based communication components and mobile communication components, such as telephony switches, modems, cellular communication towers, and the like. The network 130 can include line based and/or wireless communication pathways.

Figure 2:
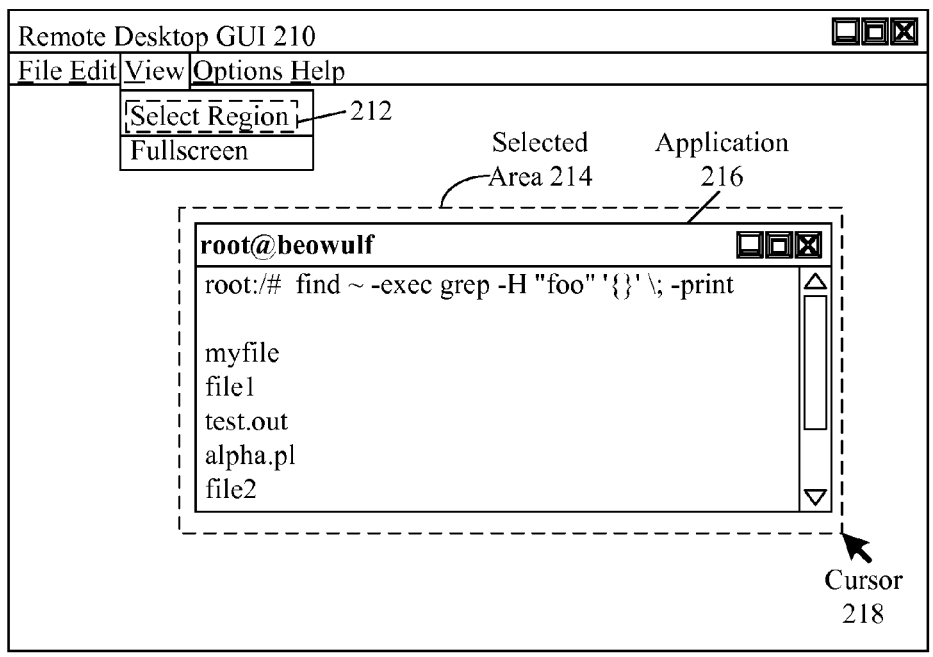
FIG. 2 is a schematic diagram illustrating a graphical interface user (GUI) of a remote desktop client, which allows for an establishment of preferred rendering areas in accordance with an embodiment of inventive arrangements disclosed herein.
Figure 2:
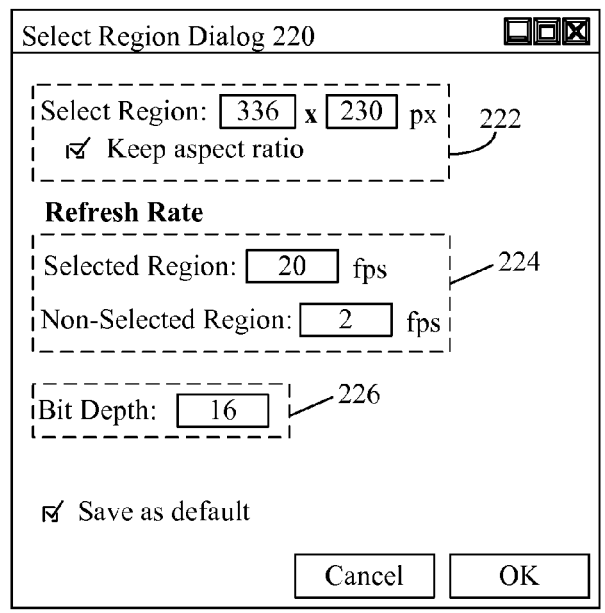

FIG. 2 is a schematic diagram illustrating a graphical interface user (GUI) 200 of a remote desktop client, which allows for an establishment of preferred rendering areas in accordance with an embodiment of inventive arrangements disclosed herein. GUI 200 can be present in the context of system 100. Remote desktop GUI 210 and dialog 220 can be associated with a remote desktop session.

In GUI 210, a user interacting with a remote desktop GUI 210 can choose a menu entry select region 212. Entry 212 can allow a user to utilize cursor 218 to select an area 214. For example, a user can select an area 214 surrounding application 216. In one embodiment, areas surrounding selected area 214 can be grayed out (or shown with some other demarcation construct) to emphasize selected area 214. Upon selecting area 214, a select region dialog 220 can be presented to the user for configuring selected area 214.

Dialog 220 can include render options 222-226. Region 222 can include measurements of selected area including, but not limited to, pixels, inches, millimeters, and the like. Region 224 can include user configurable settings for selected and non-selected regions. Settings can include, but are not limited, frame rate settings, resolution, scaling/zoom factors, and the like. Further configurable options can include bit/color depth as shown in section 226.

In one embodiment, GUI 210 can include management options for selected area 214 after a selected area has been established. Management can include, but is not limited to, resizing, removal, adjustment of settings, and the like. Management of multiple selected areas can also be contemplated.

As shown herein, GUI 210 is for illustrative purposes only and should not be construed to limit the invention in any regard.

Figure 3:
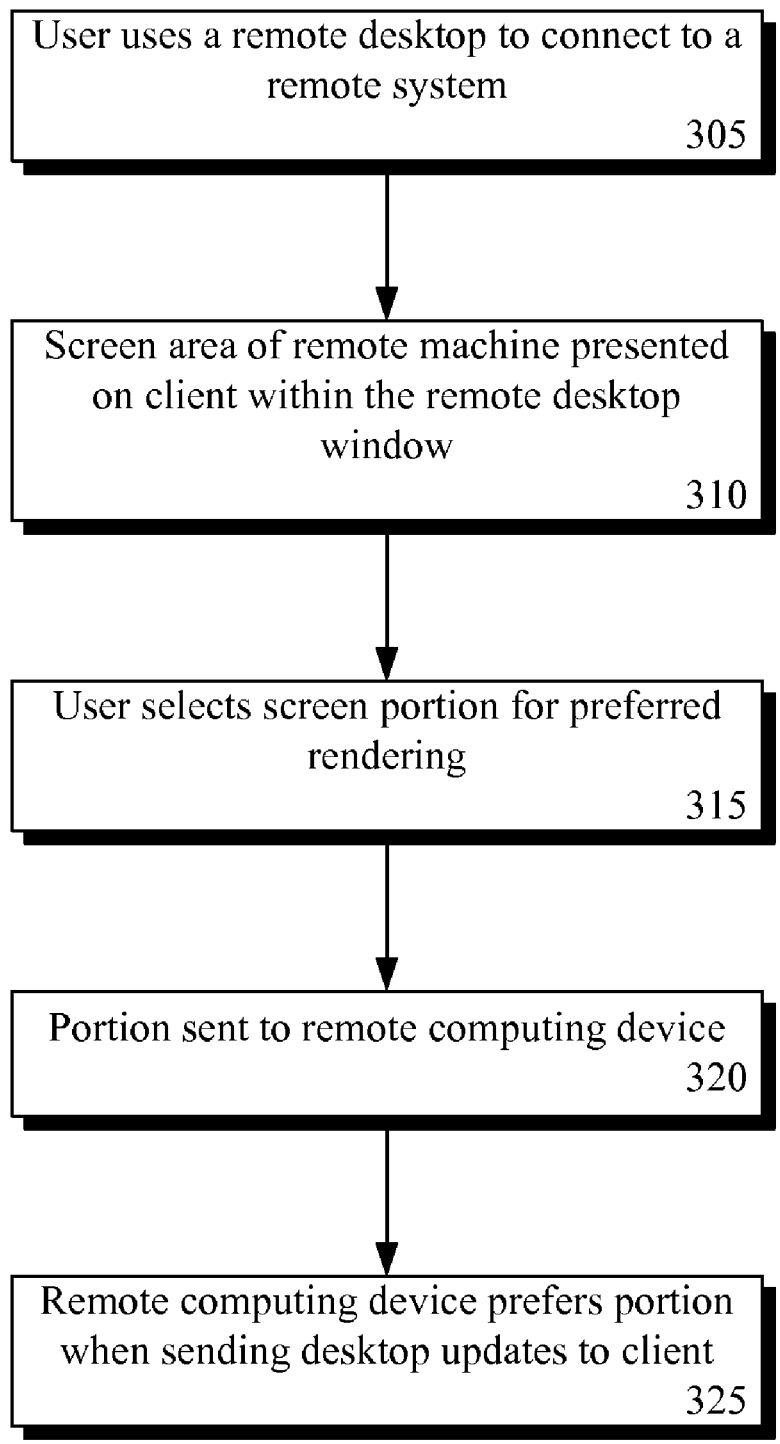
FIG. 3 is a schematic diagram illustrating a method for establishing a preferred rendering area for a remote desktop in accordance with an embodiment of inventive arrangements disclosed herein.

FIG. 3 is a schematic diagram illustrating a method 300 for establishing a preferred rendering area for a remote desktop in accordance with an embodiment of inventive arrangements disclosed herein. Method 300 can be performed in the context of system 100. In method 300, a user can select a portion of a remote desktop screen to be selectively updated.

In step 305, a user can use remote desktop software to connect to a remote system. In step 310, a screen area of the remote machine can be presented on the client within the remote desktop software window. In step 315, a user can select a portion of the screen for preferred rendering. In step 320, the user selected portion can be sent to the remote computing device. In step 325, the remote computing device can prefer the user selected portion when sending updates to client. Preference in this context indicates that more bandwidth is consumed to handle the user selected portion of the remote desktop region than other comparable portions of the remote desktop region.

The present invention may be realized in hardware, software or a combination of hardware and software. The present invention may be realized in a centralized fashion in one computer system or in a distributed fashion where different elements are spread across several interconnected computer systems. Any kind of computer system or other apparatus adapted for a carrying out methods described herein is suited. A typical combination of hardware and software may be a general purpose computer system with a computer program that, when being loaded and executed, controls the computer system such that it carries out the methods described herein.

The present invention also may be embedded in a computer program product that is stored on a computer readable medium. The computer program product can comprise all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for preferring an area of a remote desktop comprising:
   defining a region of a remote desktop executing on a client as a preferred rendering region;
   conveying a message specifying the preferred rendering region from the client to a host server; and
   the host server conveying data to the client, the data being used by the remote desktop, wherein the preferred rendering region is preferred for rendering purposes over other areas of the remote desktop.

2. The method of claim 1, wherein a quantity of data conveyed from the host server is greater for the preferred rendering region than a quantity of data conveyed for other regions of the remote desktop.

3. The method of claim 1, wherein a quantity of graphic rendering computing resources used to render the preferred rendering region is comparatively greater than a quantity of graphic rendering computing resources used to render other regions of the remote desktop.

4. The method of claim 1, further comprising:
   within an interface of the remote desktop, graphically selecting an area of the remote desktop interface, wherein the preferred rendering region of the defining step is the graphically selected area.

5. The method of claim 4, further comprising:
   visually demarking the preferred rendering region within the remote desktop interface from other portions of the remote desktop interface.

6. The method of claim 1, wherein the conveyed data from the host server includes graphical data for only the preferred rendering region, said method further comprising:
   the client receiving the conveyed data, which triggers a refresh operation that is limited to the preferred rendering region.

7. The method of claim 1, wherein the conveyed data from the host server comprises a plurality of separate data payload messages conveyed at different intervals, wherein a greater quantity of the payload messages comprise rendering data for only the preferred region than a quantity of payload messages that comprise rendering data for an entire region of the remote desktop.

8. The method of claim 7, wherein all of the payload messages comprise rendering data for only the preferred region.

9. The method of claim 1, wherein the preference for rendering purposes is based upon a rendering characteristic comprising at least one of resolution, color depth, and frame rate.

10. The method of claim 1, wherein said steps of claim 1 are performed by at least one machine in accordance with at least one computer program stored in a non-transitory computer readable media, said computer program having a plurality of code sections that are executable by the at least one machine.

11. A remote desktop system comprising:
    a host computing device configured to execute a set of desktop applications;
    a remote computing device configured to permit a user to interact with the executing set of desktop applications from the remote computing device using remote desktop technologies; and
    remote client software executing upon the remote computing device comprising a capability that permits a user to define a preferred rendering region of a remote desktop interface, wherein a quantity of data conveyed from the host server to the remote computing device over a network connecting the two is comparatively greater for the preferred rendering region than a quantity of data conveyed for other regions of the remote desktop.

12. The remote desktop system of claim 11, wherein a preference for rendering purposes relating to the preferred region is based upon a rendering characteristic comprising at least one of resolution, color depth, frame rate, and update frequency.

13. The remote desktop system of claim 11, wherein the remote desktop interface comprises:
    a user selectable option for graphically defining a preferred region of a remote desktop interface; and
    a visual demarcation element for visually distinguishing the preferred rendering region from other regions of the remote desktop interface.

14. The remote desktop system of claim 11, wherein the remote client software is configured to receive data payload messages from the host computing device that are specific to the user defined preferred rendering region, wherein upon receiving the data payload messages, the remote client software executes action to refresh only the portion the remote desktop interface defined by the preferred rendering region, wherein the refresh is based upon the received data payload messages.

15. A computer program product stored on a non-transitory computer readable medium, said computer program having a plurality of code sections that are executable by at least one machine, said computer program comprising a remote desktop interface comprising:
- a user selectable option for graphically defining a preferred region of the remote desktop interface of the computer program, which is stored on the non-transitory computer readable medium, wherein the preferred rendering region is preferred for rendering purposes over other areas of the remote desktop that are displayed within the remote desktop interface.

16. The computer program product of claim 15, wherein a quantity of data conveyed from a host server to a client executing the remote desktop interface is comparatively greater for the preferred rendering region than a quantity of data conveyed for other regions of the remote desktop.

17. The computer program product of claim 16, said remote desktop interface further comprising:
- a visual demarcation element for visually distinguishing the preferred rendering region from other regions of the remote desktop interface.

18. The computer program product of claim 15, wherein a preference for rendering purposes relating to the preferred region is based upon a rendering characteristic comprising at least one of resolution, color depth, frame rate, and update frequency.

* * * * *